United States Patent [19]

Moitzfeld

[11] Patent Number: 5,320,516
[45] Date of Patent: Jun. 14, 1994

[54] SYSTEM FOR MAKING BELTS

[75] Inventor: Winfried Moitzfeld, Krefeld, Fed. Rep. of Germany

[73] Assignee: G. Siempelkamp GmbH & Co., Krefeld, Fed. Rep. of Germany

[21] Appl. No.: 987,767

[22] Filed: Dec. 7, 1992

[30] Foreign Application Priority Data

Dec. 7, 1991 [DE] Fed. Rep. of Germany ....... 4140396

[51] Int. Cl.⁵ ...................... B29C 31/08; B30B 15/30
[52] U.S. Cl. ................................ 425/406; 100/93 P; 100/215; 226/199; 264/297.5; 264/297.8
[58] Field of Search ................... 156/137-142, 156/583.1, 583.5, 405.1; 100/93 P, 215, 152, 173, 41, 88; 425/28.1, 34.1, 34.2, 403.1, 406, 505, 508; 264/297.5, 297.8, 347; 226/170, 172, 199; 83/102.1

[56] References Cited

U.S. PATENT DOCUMENTS

| | | | |
|---|---|---|---|
| 1,125,637 | 1/1915 | Beaudry | 83/102.1 |
| 2,867,845 | 1/1959 | Sauer | 425/34.2 |
| 3,785,277 | 1/1974 | Schmitt | 100/41 |
| 3,902,648 | 9/1975 | Keyser | 226/199 |
| 4,036,572 | 7/1977 | Yeager | 425/338 |
| 4,166,526 | 9/1979 | Wykes et al. | 226/199 |
| 4,368,014 | 1/1983 | Moitzeld | 425/28 B |
| 4,573,404 | 3/1986 | Held | 156/583.5 |
| 4,946,541 | 8/1990 | Thies | 156/580 |
| 5,159,865 | 11/1992 | Hinckley | 83/102.1 |

FOREIGN PATENT DOCUMENTS

| | | | |
|---|---|---|---|
| 503396 | 6/1954 | Canada | 226/196 |
| 2923036 | 12/1980 | Fed. Rep. of Germany | 100/93 P |
| 3133820 | 3/1983 | Fed. Rep. of Germany | 425/28.1 |
| 53338 | 3/1982 | Japan | 264/347 |

Primary Examiner—Michael W. Ball
Assistant Examiner—Steven D. Maki
Attorney, Agent, or Firm—Herbert Dubno; Andrew Wilford

[57] ABSTRACT

At least two flexible belts each having a pair of longitudinal edges are fed parallel to each other to a uniting station with one edge of one unfinished belt transversely confronting one edge of the other unfinished belt. The two unfinished belts are laterally separated at the station so that their one edges are spaced from and parallel to each other and a separator belt is inserted into a space defined between the one edges. Then the two unfinished belts and the separator belt are fed together into a press, and are there hot pressed.

9 Claims, 3 Drawing Sheets

SYSTEM FOR MAKING BELTS

FIELD OF THE INVENTION

The present invention relates to the manufacture of belts, specifically conveyor belts. More particularly this invention concerns a method of and apparatus for finish-pressing such belts at least two at a time.

BACKGROUND OF THE INVENTION

In the production of continuous belting, for instance for the manufacture of conveyor belts, it is standard to laminate together the various layers of the belt, typically of outer layers of elastomer sandwiching a core layer of reinforcement as described in U.S. Pat. No. 4,386,014 and then to hot press this laminate together in a continuous press. Such a continuous press can have upper and lower press parts as described in U.S. Pat. No. 4,946,541 through which endless steel liner belts move, or can have heated rollers between which the belt is squeezed.

Clearly it is essential that the press exert a uniform pressure over the entire belt surface in order to avoid squeezing the belt too thin in some locations and leaving it too thick in others. This is not a problem if the belt has a width measured transversely to its normal transport direction through the press that is roughly equal to the press width measured in the same direction.

When, however, a narrower belt is to be pressed, it is normally necessary to press several such belts at the same time. This has the disadvantage that, if the belts abut laterally, they can become laterally fused together, and, if they are spaced somewhat, the edges are subjected to excessive pressure which leaves these edges too thin.

Alternately it is possible to make a single wide belt and subsequently slit it longitudinally to subdivide it transversely into two or more narrower belts. This leaves the reinforcement exposed at the belt edges and is generally expensive and unsatisfactory.

OBJECTS OF THE INVENTION

It is therefore an object of the present invention to provide an improved system for making belts.

Another object is the provision of such an improved system for making belts which overcomes the above-given disadvantages, that is which can produce at the same time several narrow belts that are of uniform thickness, that have clean square edges, and that are not transversely joined.

SUMMARY OF THE INVENTION

At least two flexible belts each having a pair of longitudinal edges are fed parallel to each other to a uniting station with one edge of one unfinished belt transversely confronting one edge of the other unfinished belt. The two unfinished belts are laterally separated at the station so that their one edges are spaced from and parallel to each other and a separator belt is inserted into a space defined between the one edges. Then the two unfinished belts and the separator belt are fed together into a press, and are there hot pressed.

Thus with this system it is possible to produce two or more narrow belts in a press designed to make a single wide belt. The two or more belts are kept apart by the separator belt which prevents the unfinished belt edges from being squeezed excessively while also preventing these edges from being bonded together. The separator belt is made of a material with the same compressibility as the unfinished belts, but has a nonstick coating or covering on its edges so that the rubber or plastic of the belts being manufactured does not adhere to its edges.

According to the invention the separator belt is endless and is continuously circulated through the press. Furthermore, the unfinished belts are pushed laterally toward each other so that their one confronting edges laterally abut outer edges of the separator belt and the unfinished belts are oriented so that they symmetrically flank a centerline of the separator belt. In accordance with this invention the unfinished belts are deflected around a deflector roller immediately upstream of the uniting station.

The apparatus for carrying out the method has upstream transport means for feeding two unfinished belts parallel to each other to a uniting station with one edge of one unfinished belt transversely confronting one edge of the other unfinished belt and a separator at the station for separating the two unfinished belts so that their one edges are spaced from and parallel to each other. Feed means inserts a separator belt into a space defined between the one edges and downstream transport means feeds the two unfinished belts and the separator belt from the station together into the hot press.

In accordance with further features of the invention biasing or urging units such as hydraulic cylinders are provided upstream of the station for pushing the belts laterally toward each other and for pushing the one confronting edges of the unfinished belt against longitudinal outer edges of the separator belt. This biasing means includes a pair of laterally movable biasing rollers engaging the other longitudinal edges of the unfinished belts.

The feed means of this invention has an upstream roller over which the unfinished belts pass, a downstream roller over which the unfinished belts and the separator belt pass, and an intermediate roller between the upstream and downstream rollers under which the unfinished belts pass. The unfinished and separator belts are pinched between the intermediate and downstream rollers.

The belt-making apparatus may also have a pair of laterally displaceable separator elements, and means for laterally positioning and arresting the separator elements. The separator elements can be vertically positioned and arrested also.

A pair of outer holder belts can laterally flank and engage the other longitudinal edges of the unfinished belts in the press. This is useful for making reinforced belts to produce clean and square outer edges on them. These holder belts are endless and continuously circulate through the press and, like the separator belt, they have square longitudinal edges.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
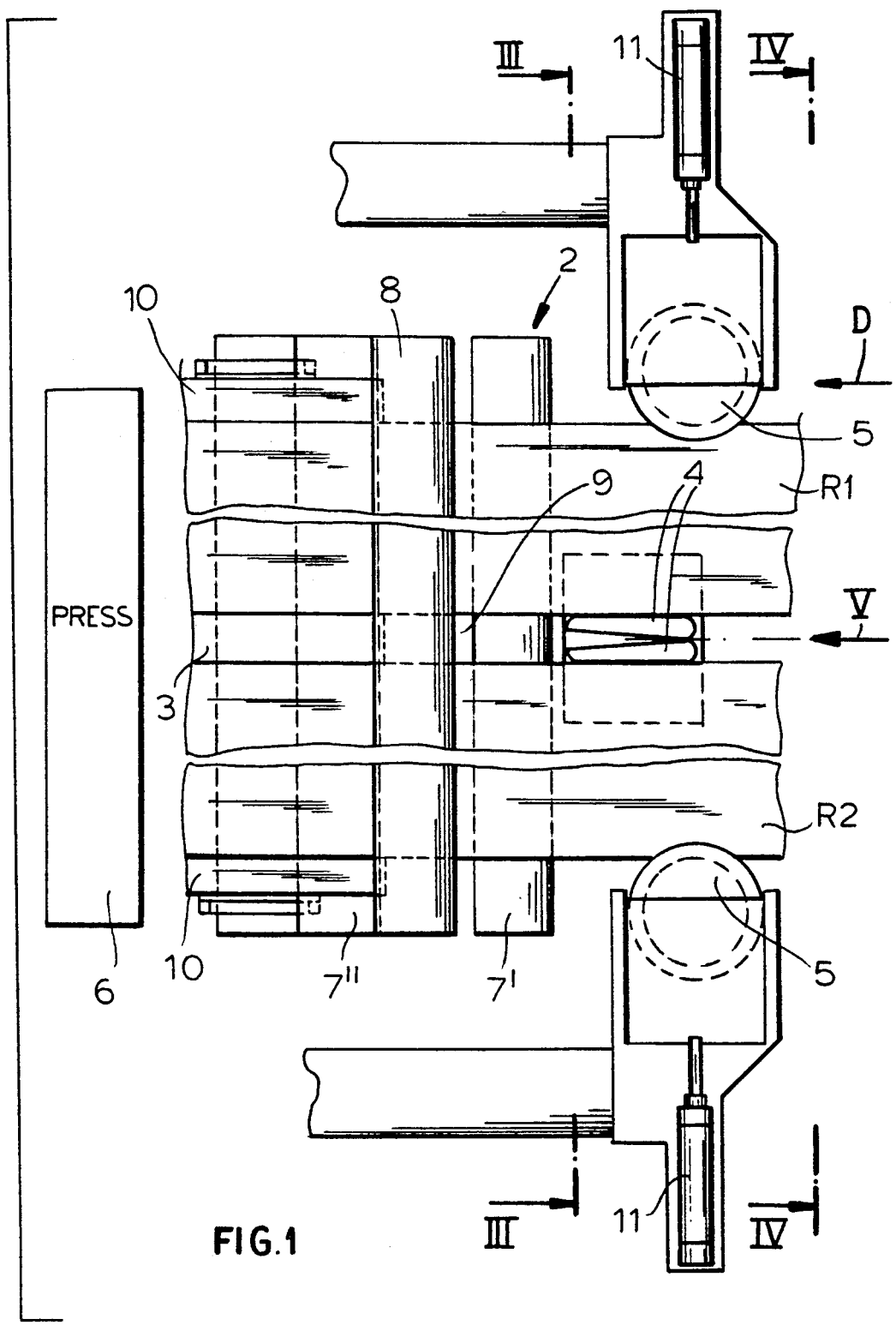
FIG. 1 is a partly diagrammatic top view of the apparatus for carrying out the method of this invention.
Figure 2:
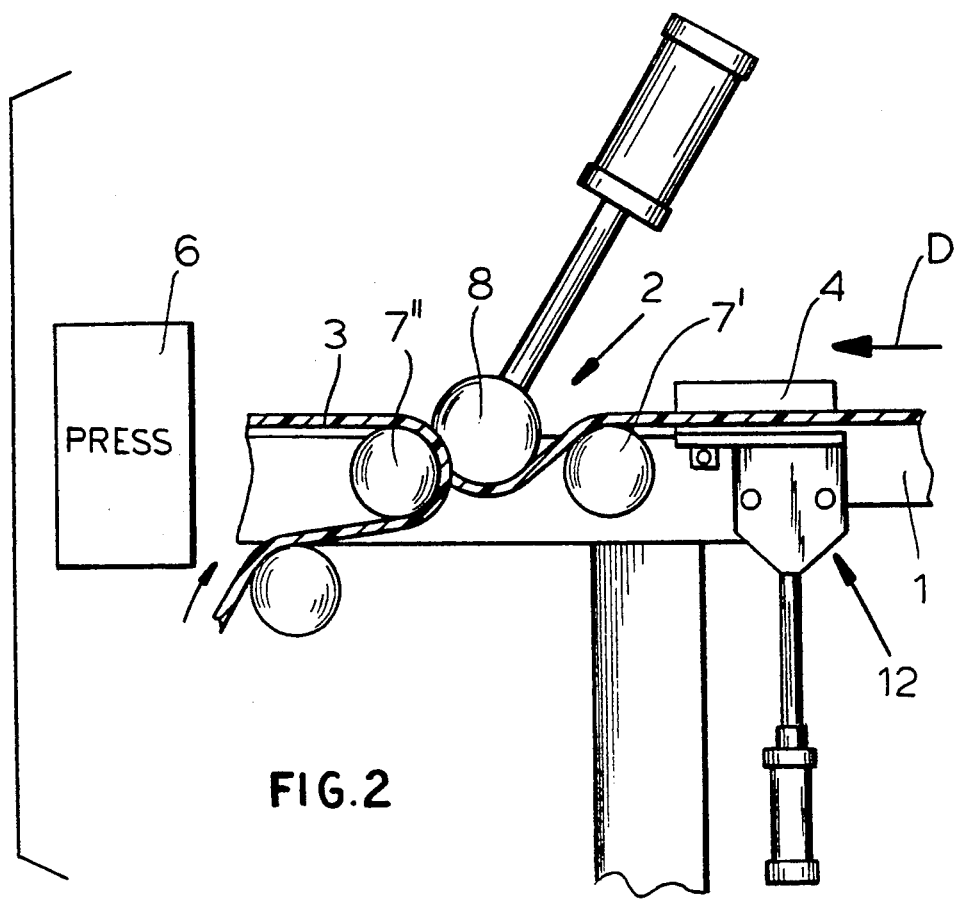
FIG. 2 is a side view of the apparatus.
Figure 3:
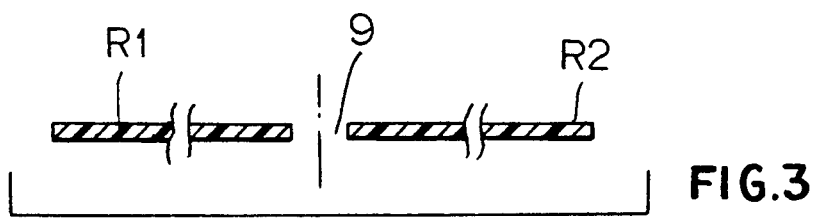
FIGS. 3 and 4 are sections taken respectively along lines III—III and IV—IV of FIG. 1.

As seen in the drawing a pair of flat unfinished belts R1 and R2 are fed by a conveyor 1 in a horizontal transport direction D to a uniting station 2 where they move with an endless separator belt 3 into a press 6. At the station 2 the unfinished belts R1 and R2 pass over an upstream roller 7', under an intermediate roller 8, and over a downstream roller 7" before entering the press 6.

Figure 4:
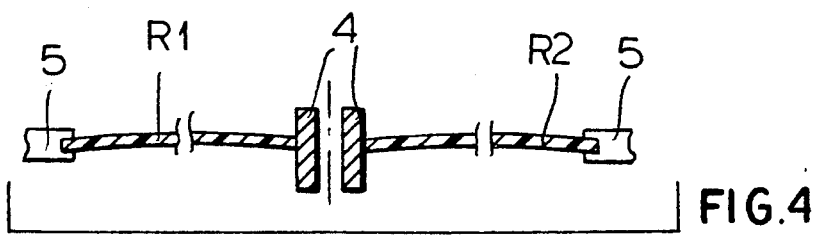
Figure 5:
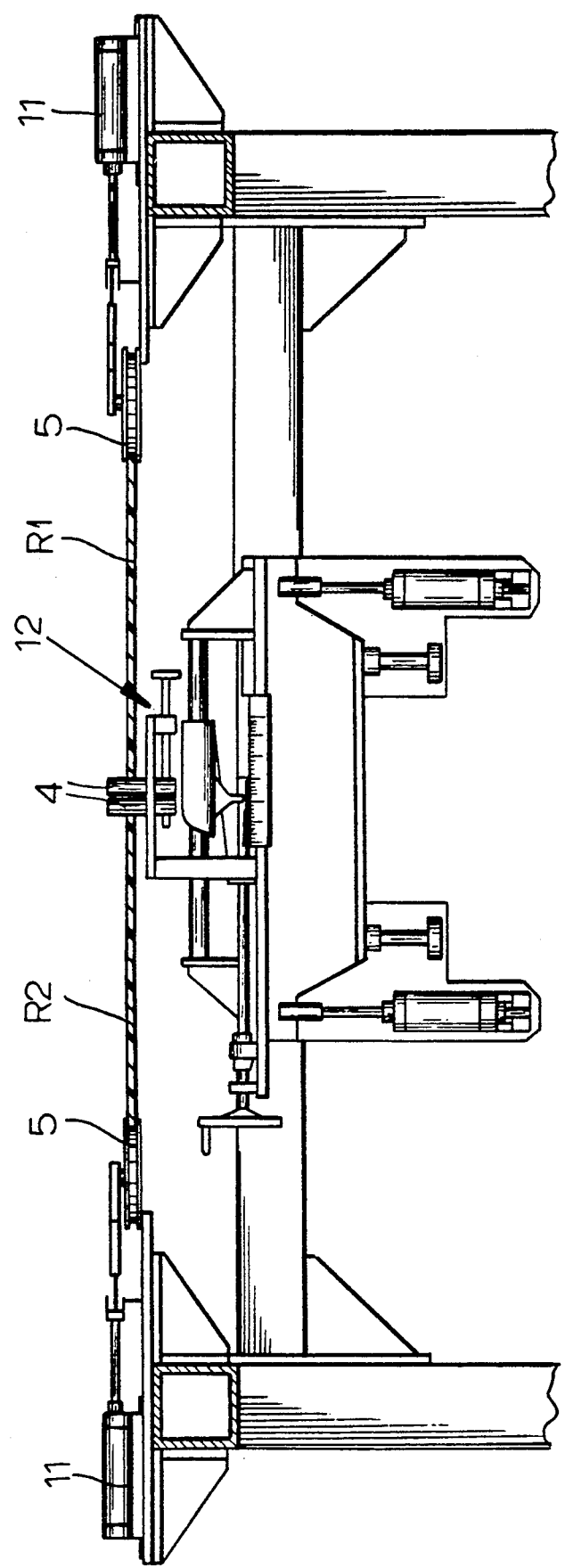
FIG. 5 is an end view taken in the direction of arrow V of FIG. 1.

The separator belt 3 is continuous and circulates around the downstream roller 7" for insertion into a longitudinally extending gap 9 formed by separator or splitter elements 4 between the inner confronting edges of the belts R1 and R2, thereby uniting with them. The unfinished belts R1 and R2 are pressed laterally together against the splitter elements 4 by edge rollers 5 that are urged inward by hydraulic rams 11 as seen in FIG. 4. The separator elements 4 are carried by an adjustment mechanism 12 that allows their vertical position and lateral spacing to be adjusted and that can arrest them, that is fix them stationarily in place in the set position.

FIG. 1 also shows how outer edge or holder belts 10 like the belt 3 can circulate over the roller 7" and through the press 6 to square the outer edges of the belts R1 and R2.

Thus with this system the belts 3 and 10 will prevent the press 6 from exerting excessive pressure at the edges of the belts R1 and R2. This makes it possible to hot press several narrow belts in a press built for a wide press, and to produce narrow belts of uniform thickness with square finished edges.

The system described above produces only two belts, but of course three or more could be manufactured at one time using the principles of this invention.

I claim:

1. An apparatus for making at least two flexible belts each having a pair of longitudinal edges, the apparatus comprising:
    upstream transport means for feeding two unfinished belts parallel to each other to a station with one edge of one unfinished belt transversely confronting one edge of the other unfinished belt;
    means including a separator at the station for separating the two unfinished belts so that their one edges are spaced from and parallel to each other, the separator including
    a pair of laterally displaceable separator elements, and
    means for laterally positioning and arresting the separator elements;
    feed means for inserting a separator belt into a space defined between the one edges;
    downstream transport means for feeding the two unfinished belts and the separator belt from the station together into a press; and
    means including the press for hot pressing the unfinished and separator belts.

2. The belt-making apparatus defined in claim 1, further comprising
    urging means upstream of the station for pushing the belts laterally toward each other and for pushing the one confronting edges of the unfinished belts against longitudinal outer edges of the separator belt.

3. The belt-making apparatus defined in claim 2 wherein the urging means includes:
    a pair of laterally movable biasing rollers engaging the other edges of the unfinished belts, and
    biasing means pressing the biasing rollers toward each other.

4. The belt-making apparatus defined in claim 2 wherein the feed means includes:
    an upstream roller over which the unfinished belts pass,
    a downstream roller over which the unfinished belts and the separator belt pass, and
    an intermediate roller between the upstream and downstream rollers under which the unfinished belts pass, the unfinished and separator belts being pinched between the intermediate and downstream rollers.

5. The belt-making apparatus defined in claim 1 wherein the separator belt is endless, so that the separator belt can be continuously circulated through the press.

6. The belt-making apparatus defined in claim 1 wherein the separator further includes
    means for vertically positioning and arresting the separator elements.

7. The belt-making apparatus defined in claim 1, further comprising
    a pair of outer holder belts laterally flanking and engaging the other longitudinal edges of the unfinished belts in the press.

8. The belt-making apparatus defined in claim 7 wherein the holder belts are endless, so that the holder belts can be continuously circulated through the press.

9. The belt-making apparatus defined in claim 1 wherein the separator belt has square longitudinal edges.

* * * * *